United States Patent
Gati et al.

(10) Patent No.: US 9,641,008 B2
(45) Date of Patent: May 2, 2017

(54) DEVICE FOR RECHARGING AN AUTOMOBILE BATTERY AND METHOD FOR MANAGING THE DEVICE

(75) Inventors: Mehdi Gati, Sceaux (FR); Ahmed Ketfi-Cherif, Elancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 974 days.

(21) Appl. No.: 13/821,363

(22) PCT Filed: Aug. 3, 2011

(86) PCT No.: PCT/FR2011/051866
§ 371 (c)(1),
(2), (4) Date: Apr. 24, 2013

(87) PCT Pub. No.: WO2012/032241
PCT Pub. Date: Mar. 15, 2012

(65) Prior Publication Data
US 2013/0214729 A1   Aug. 22, 2013

(30) Foreign Application Priority Data

Sep. 7, 2010   (FR) ...................................... 10 57103

(51) Int. Cl.
*H02J 7/06*     (2006.01)
*H02J 7/24*     (2006.01)
(Continued)

(52) U.S. Cl.
CPC ......... *H02J 7/0052* (2013.01); *B60L 11/1816* (2013.01); *H02J 7/06* (2013.01);
(Continued)

(58) Field of Classification Search
CPC .............. B60L 11/1811; B60L 11/1812; B60L 11/1816; H02M 7/217
(Continued)

(56) References Cited

U.S. PATENT DOCUMENTS 5,367,448 A * 11/1994 Carroll ................... H02M 3/28
323/207
6,043,999 A    3/2000  Ehrenberg et al.
(Continued)

FOREIGN PATENT DOCUMENTS

EP        1 914 870 A1    4/2008

OTHER PUBLICATIONS

U.S. Appl. No. 14/111,925, filed Oct. 15, 2013, Gati, et al.
(Continued)

*Primary Examiner* — Richard Isla Rodas
*Assistant Examiner* — David V Henze-Gongola
(74) *Attorney, Agent, or Firm* — Oblon, McClelland, Maier & Neustadt, L.L.P.

(57) ABSTRACT

A rapid charging device for a battery includes a filtering stage of resistive-inductive-capacitive type to be connected to a three-phase network, a buck stage, a boost stage to be connected to the battery, an induction winding interposed between the buck stage and the boost stage, and a regulating unit capable of imposing chopping duty cycles on the buck stage and on the boost stage. The regulating unit compensates the phase shift induced by the filtering stage between the currents and the voltages taken from each phase of the three-phase network and also maintains the value of the current amplitude passing through the winding above a non-zero predefined threshold.

10 Claims, 3 Drawing Sheets

(51) Int. Cl.
  *H02P 1/30* (2006.01)
  *H02P 1/52* (2006.01)
  *H02P 3/00* (2006.01)
  *H02P 7/06* (2006.01)
  *H02P 27/04* (2016.01)
  *H02M 7/217* (2006.01)
  *H02J 7/00* (2006.01)
  *B60L 11/18* (2006.01)

(52) U.S. Cl.
  CPC ......... *H02M 7/217* (2013.01); *Y02T 10/7005* (2013.01); *Y02T 10/7072* (2013.01); *Y02T 90/127* (2013.01); *Y02T 90/14* (2013.01)

(58) Field of Classification Search
  USPC .......... 320/137, 163, 164; 318/503; 363/127
  See application file for complete search history.

(56) References Cited

U.S. PATENT DOCUMENTS

| | | | |
|---|---|---|---|
| 7,268,526 | B1 | 9/2007 | Smith |
| 2006/0072352 | A1* | 4/2006 | Ghosh ................. H02M 1/4233 363/53 |
| 2007/0040534 | A1 | 2/2007 | Ghosh et al. |
| 2008/0030178 | A1 | 2/2008 | Leonard et al. |
| 2010/0246228 | A1* | 9/2010 | Kazlauskas ......... H02M 1/4225 363/127 |

OTHER PUBLICATIONS

International Search Report issued Jun. 1, 2012, in PCT/FR2011/051866.

Shibashis Bhowmik, et al., "Sensorless Current Control for Active Rectifiers", IEEE Transactions of Industry Applications, vol. 33, No. 3, XP-011022191, Jun. 1, 1997, pp. 765-773.

Michael Lindgren, et al., "Control of a Voltage-source Converter Connected to the Grid through an LCL-filter-Application to Active Filtering", Power Electronics Specialists Conference, 1998, vol. 1, XP-010294951, May 17, 1998, pp. 229-235.

Joerg Dannehl, et al., "Limitations of Voltage-Oriented PI Current Control of Grid-Connected PWM Rectifiers With LCL Filters", IEEE Transactions on Industrial Electronics, vol. 56, No. 2, XP-011237609, Feb. 1, 2009, pp. 380-388.

* cited by examiner though not necessarily at the same instant, slave the current passing through the electrical machine to a non-zero setpoint value.

DEVICE FOR RECHARGING AN AUTOMOBILE BATTERY AND METHOD FOR MANAGING THE DEVICE

The invention lies in the field of rapid charging devices for high-voltage batteries from an output of a three-phase network and in particular a rapid recharging device for an automobile battery.

In such recharging systems, the electrical power is brought from the network to the battery in succession through two converters: a buck (voltage step-down) converter and a boost (voltage step-up) converter. These two converters are used respectively to lower and raise the ratio of voltages between their output terminals and their input terminals, by opening and by closing a series of switches in succession, at a frequency which can be controlled as a function of the desired output current and/or output voltage.

Such recharging systems are, for example, described in the patent application FR 2 943 188 which relates to an onboard recharging system for an automobile, making it possible to recharge a battery of the vehicle from a three-phase circuit, the recharging circuit incorporating the windings of an electrical machine which also ensures other functions such as current generation or vehicle propulsion.

The chopping of the current drawn from the network induces high-frequency components in the current taken, that is to say harmonics of an order greater than the fundamental of the distribution network which is conventionally 50 Hz.

Since the electricity distributor imposes a standard on the harmonics of the current taken, such a recharging system also comprises a filter of RLC (resistive-inductive-capacitive) type at the input of the buck stage. This filter induces a phase-shift between the current and the voltage taken from the network. This phase-shift implies a reactive power passing through the network, but not taken by the user, and that should also be minimized.

The aim of the invention is to propose a device for regulating the buck stage and the boost stage of such a recharging device, which makes it possible, despite the presence of an RLC filter at the input of the device, to maintain a reduced phase-shift between the current and the voltage taken from the network.

Another aim of the invention is to propose an onboard recharging device for an automobile, suitable for being able to be connected to an external three-phase network, and incorporating in its circuit the winding of an electrical machine of the vehicle.

To this end, a rapid recharging device for a battery, notably for an automobile battery, comprises a filtering stage of resistive-inductive-capacitive type intended to be connected to a three-phase network, a buck stage, and a boost stage, intended to be connected to the battery, as well as an induction winding interposed between the buck stage and the boost stage. The device also comprises a regulating unit capable of imposing chopping duty cycles on the buck stage and on the boost stage. The regulating unit comprises compensation means for the phase shift induced by the filtering stage between the currents and voltage taken from each phase of the three-phase network, and also comprises means for maintaining the value of the current amplitude passing through the winding above a non-zero predefined threshold.

Advantageously, the regulating unit also comprises means for slaving the current entering into the battery to a battery current setpoint value.

Preferentially, the device comprises means for measuring current intensities entering into the device through the phases of the three-phase network, means for measuring the intensity of the current passing through the winding, and the regulating unit comprises at least two regulating loops using measured intensity values to deliver three values used as buck stage chopping duty cycle setpoints.

The regulating unit may comprise a third regulating loop, delivering a value used as boost stage chopping duty cycle setpoint.

According to a preferred embodiment, the regulating unit comprises means for determining three sinusoidal input voltages at the points of connection of the device to the three-phase network, and at least one first regulating loop involves the pulsing of the input voltages of the device.

Advantageously, the first regulating loop is configured to slave to zero a component obtained as a linear combination of the values of the input current intensities, the coefficients of the linear combination being trigonometric functions of $\omega t$, where $\omega$ is the pulsing of the input voltages of the device, and t is a measurement of time.

Preferentially, the regulating unit comprises an operator capable of performing three linear combinations of two values derived from two of the regulating loops, the coefficients of each of the three linear combinations being trigonometric functions of $\omega t$.

The regulating unit can, for example, be configured to perform a first change of reference frame on a vector having for component the input currents of the device, by calculating one, two or three incoming current intensity components, in a frame of reference rotating in relation to the initial frame of reference at an angular rotation speed $\omega$ corresponding to the pulsing $\omega$ of the voltages at the points of connection of the system to the three-phase network. The regulating unit can be configured to then use the deviation from a setpoint value, of one of the components calculated in the new base, as input value for one of the two regulating loops respectively delivering two variables then used by the regulating unit to calculate, through another change of rotating reference frame, three buck stage chopping duty cycle setpoint values.

The device may comprise a means for measuring the intensity of the current passing through the electrical machine. The regulating unit can then be configured to respectively compare, either one of the components in the new base and the current intensity passing through the electrical machine, or two of the components calculated in the new base, by calculating, for each value, its deviation from zero or its deviation from a setpoint value, then to use the two deviations obtained as inputs for two PID regulators respectively delivering two current intensity setpoint values. The setpoint value may be a constant function, or may be a setpoint function generated according to the energy needs of the battery.

The regulating unit may comprise an operator capable of applying to the vector $(If_d, If_q, 0)$ defined by the two current intensity setpoint values $If_d$ and $If_q$ delivered by the two PID regulators, a reference frame change matrix that is the inverse of the first reference frame change. It may comprise operators capable of dividing the three intensities obtained following this second change of reference frame, by the measured intensity passing through the induction winding, and one or more pilot modules capable of using the three results as buck stage chopping duty cycle setpoint values.

The regulating unit can, for example, be configured to slave, in the new reference frame, one of the incoming current intensity components to zero, and simultaneously slave another of the components to a reference setpoint value, in order to calculate three buck stage chopping duty cycle setpoints.

It may then comprise, in parallel, a regulating loop, capable of delivering a boost stage chopping duty cycle setpoint value, the loop having for input value the deviation between a second setpoint value and the measured current passing through the induction winding machine.

According to another embodiment, the regulating unit can comprise a first regulating loop capable of slaving, in the new reference frame, one of the incoming current intensity components to zero, and a second regulating loop capable of slaving the measured current passing through the induction winding to a setpoint value in order to calculate three buck stage chopping duty cycle setpoints.

It may then comprise, in parallel, a regulating loop capable of delivering a boost stage chopping duty cycle setpoint value, from the current measured at the terminals of the battery, from the battery power supply current setpoint, and from the measured current passing through the induction winding.

According to another aspect, a method for regulating a rapid charging device for a battery from a three-phase current comprises a step of controlling the chopping duty cycles of a buck stage, during which there is compensated, by combining the results of two regulating loops, a phase shift induced by a filtering stage of resistive-capacitive-inductive type, between the input current intensities of the device and the input voltages of the device.

According to a preferred implementation of the method, the input voltages of the device are filtered to be able to model them by three components of a vector rotating in a plane with a pulsing $\omega$, then a regulating loop is applied to cancel the component in this plane, at right angles to the modeled vector of the input voltages, of the vector $\vec{I}e$ having three measured input intensities of the device for components.

In such a method, a linear combination of three currents measured at the input of the device is slaved to zero, the coefficients of the linear combination being trigonometric functions of $\omega t$, in which $\omega$ is a pulsing frequency of the input voltages of the device, and t is a measurement of time.

Other aims, features and advantages of the invention will become apparent on reading the detailed description of an embodiment of the invention, given as a nonlimiting example, and from the appended drawings in which.

Figure 1:
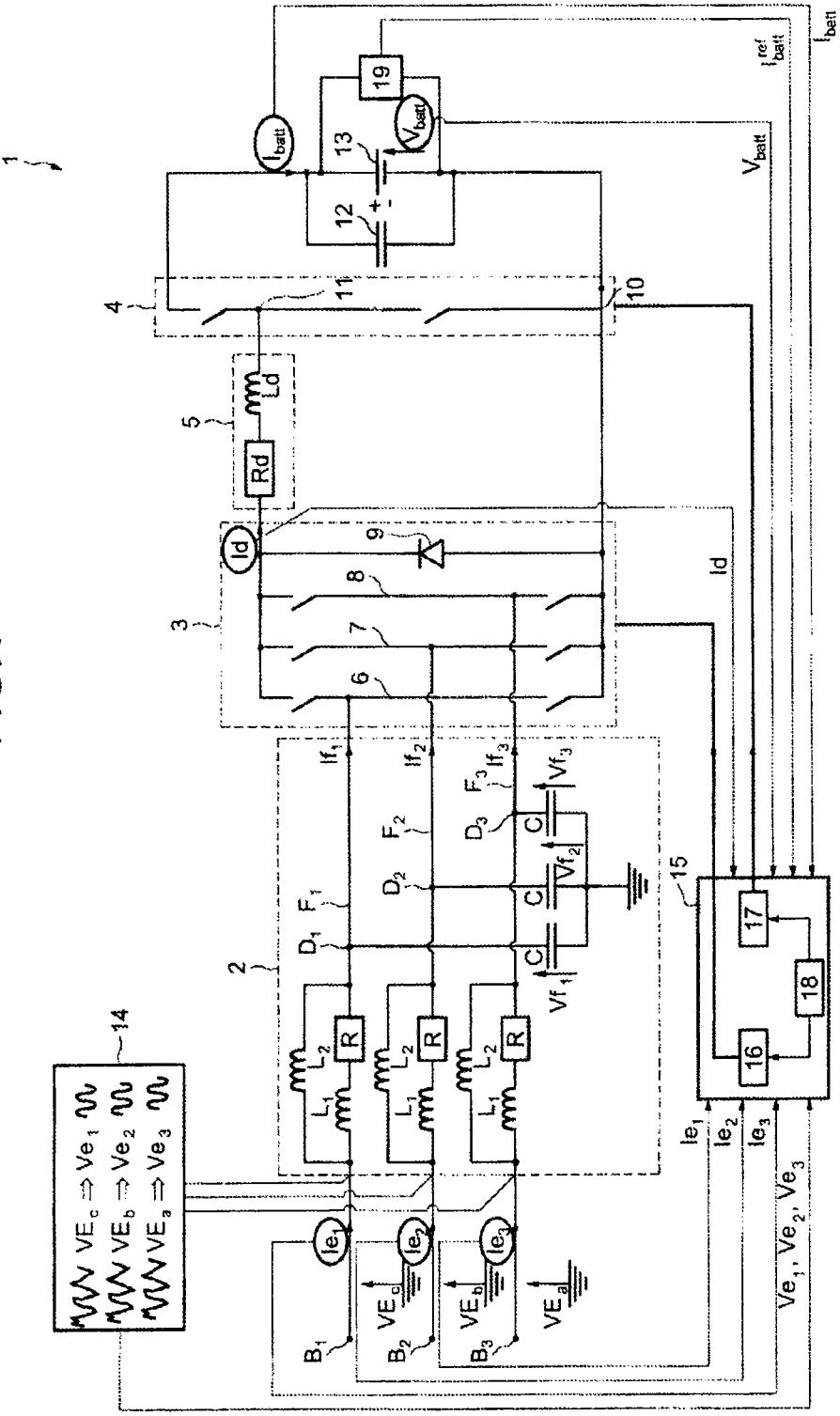
FIG. 1 illustrates a recharging device according to the invention.

As illustrated in FIG. 1, the device for recharging a battery 13 comprises three terminals $B_1$, $B_2$, $B_3$ making it possible to link the device 1 to a three-phase network. These three terminals $B_1$, $B_2$, $B_3$ are respectively linked to three inputs $D_1$, $D_2$, $D_3$ of a buck stage 3, each time through a filtering branch comprising two parallel branches, one bearing an inductor of value $L_2$ and the other bearing, in series, an inductor of value Li and a resistor of value R.

Each input terminal $D_1$, $D_2$, $D_3$ of the buck stage is also linked to the ground through a capacitor of capacitance C. Together, the resistors of values R, the inductors of values Li or $L_2$, and all of the three capacitors of values C constitute a filter of RLC type at the input of the buck stage 3.

The buck stage 3 comprises three parallel branches 6, 7 and 8 each bearing two switches controlled by a regulating unit 15. Each input $D_1$, $D_2$ or $D_3$ of the buck stage is respectively connected by a branch $F_1$, $F_2$, $F_3$ to a connection point situated between two switches of one and the same branch, respectively 6, 7 and 8.

The buck stage 3 also comprises a branch bearing a diode 9 conducting in just one direction, and connected in parallel to the branches 6, 7 and 8. The common ends of the branches 6, 7 and 8 and the branch bearing the diode 9, constitute two output terminals of the buck stage 3. One of these terminals, situated upstream of the diode of the branch 9 in the conducting direction thereof, is linked to the "−" terminal of the battery and to a first input 10 of a boost stage 4. The other of these terminals, situated downstream of the diode of the branch 9 in the conducting direction thereof is connected to a first terminal of an electrical machine 5, the other terminal of which is connected to a second input of the boost stage 4.

The description in the preceding paragraph corresponds to a first simplified embodiment of the buck stage. In this embodiment, the three branches of the buck stage are controlled in an identical manner. Other embodiments can be envisaged, such as, for example, the embodiments described in the patent application FR 2 943 188.

The branch comprising the diode 9 is optional, and there will be no deviation by eliminating it.

The boost stage 4 comprises two switches that can be controlled by the regulating unit 15, situated on a branch linking its first input 10 and the "+" terminal of the battery. The second input 11 of the boost stage 4, to which the electrical machine 5 is connected, is connected between the two switches.

An electrical machine 5 which can be likened to a resistor of value Rd arranged in series with a winding of inductance Ld is connected between the output terminal of the buck stage 3, placed downstream of the diode 9, and the second input of the boost stage 4. There will be no departure from the framework of the invention if the electrical machine 5 is replaced by a non-resistance inductance winding, or if an additional induction winding is connected in series with the electrical machine 5.

A capacitor 12 is connected to the terminals of the battery 13 in order to maintain a relatively stable voltage at the terminals of the battery 13, as well as a battery charge monitoring module 19, capable of delivering a setpoint value $I_{batt}^{ref}$ translating, as a function of the battery charge level, the optimum current intensity to be made to enter through the "+" terminal of the battery. The charge monitoring module 19 transmits the setpoint value $I_{batt}^{ref}$ to the regulating unit 15 via a dedicated connection.

Measurement means, incorporated or not in the module 19, elsewhere transmit to the regulating unit 15 a value $I_{batt}$ translating a measured current intensity actually entering into the battery, and a value $V_{batt}$ translating the voltage between the "−" terminal and the "+" terminal of the battery 13.

Other current intensity measurement modules make it possible to measure and transmit to the regulating unit the value Id of current passing through the electrical machine 5, the values $Ie_1$, $Ie_2$ and $Ie_3$ of current intensity entering via the terminals $B_1$, $B_2$ and $B_3$ of the three-phase circuit into the filter 2. A normalization module 14 is connected to the connection terminals $B_1$, $B_2$ and $B_3$ of the charging device 1, and transmits to the regulating unit 15, three values $Ve_1$, $Ve_2$, $Ve_3$ corresponding to filtered sinusoidal voltage values, and a triplet (c, a, b) defining the order in which the terminals $B_1$, $B_2$, $B_3$ are numbered in relation to their physical positions a, b, c.

The control of the boost stage 4 is conducted according to known methods from a setpoint $a_s$ defined by $a_s=I_{batt}/Id$ generated by a control module 17 of the regulating unit 15. The control of the buck stage 3 is conducted according to known methods from a chopping duty cycle defined by a triplet $(a_1, a_2, a_3)=If/Id=(Ifi/Id, If_2/Id, If_3/Id)$, and generated by a control module 16 of the regulating unit 15.

For this, the regulating unit 15 comprises two control modules (not represented), capable, for the first, of imposing a temporal pattern of opening and of closure of each of the switches of the buck stage 3, so as to obtain the chopping duty cycles $a_1$, $a_2$ and $a_3$, and capable, for the second, of imposing a temporal pattern of opening and closure on each of the switches of the boost stage 4, so as to obtain the duty cycle $a_s$.

The switches are preferably transistors allowing for rapid switching, for example transistors of IGBT (Insulated Gate Bipolar Transistor) type.

The regulating unit 15 also comprises a reference guide module 18, capable of delivering to the control modules 16 and/or 17 desired current setpoint values, either at the input ($Ie_d^{ref}$), or at the output ($Id^{ref}$) of the buck stage 3.

The regulating unit 15 receives at the input the filtered values $Vei$, $Ve_2$, $Ve_3$ of voltage at the input terminals of the device, the numbering order (c, b, a) of the terminals, the measured current values $Ie_1$, $Ie_2$, $Ie_3$ at the input terminals thus numbered $B_1$, $B_2$, $B_3$, the current value Id measured through the electrical machine 5, the current value $I_{batt}$ arriving at the "+" terminal of the battery 13, the setpoint value $I_{batt}^{ref}$ delivered by the charge monitoring module 19. Some of these values are used by the reference guide module 18 to generate an intermediate intensity setpoint. The reference guide module notably uses the setpoint values $I_{batt}^{ref}$ of current arriving at the battery, the amplitude Vm of the voltage signals at the input terminals of the device, the voltage $V_{batt}$ at the terminals of the battery 13, and the voltage $I_{batt}$ arriving at the "+" terminal of the battery 13.

The current intensity setpoint generated by the guide module 18 is transmitted to the control module 16 which uses it, together with the values $Ie_1$, $Ie_2$, $Ie_3$ of current entering at the terminals of the three-phase network, to generate, by means of a double regulating loop, three chopping duty cycle values $a_1$, $a_2$, $a_3$ making it possible to control the opening and closure cycles of the switches of the buck stage 3.

The control module 17, either from the intensity setpoint $I_{batt}^{ref}$ of current entering into the battery, or from a current setpoint generated by the reference guide module 18, operates a regulating loop delivering a control value $a_s$ representing the chopping duty cycle of the boost stage 4.

As an indication, the characteristic values of the electrical elements of the charging device 1 lie within the following ranges of values:
- the capacitors C of the filter 2 represent a few hundred μF, for example between 100 and 500 μP each,
- the capacitor 12 arranged at the terminals of the battery 13 in order to stabilize the voltage at its terminals is of the order of an mF, for example between 1 and 10 mF,
- the resistors of values R of the filtering circuit 2 are of the order of an ohm, for example between 1 and 10 ohms,
- the resistance Rd of the rotor of the electrical machine Me is of the order of a few tens of mΩ, for example between 0.01 Ω and 0.1 Ω,
- the inductors $L_1$, $L_2$, Ld respectively corresponding to the inductors of the filter 2 and to the windings of the electrical machine 5, have values of the order of a few tens of μH, for example values between 10 and 100 μH.

The major lines of the reasoning making it possible to arrive at the regulating mode that the invention proposes to apply, for the operation of the modules 16, 17 and 18 of the regulating unit 15, are now described below.

The order in which the terminals $B_1$, $B_2$ and $B_3$ are numbered is defined each time the device is connected to a three-phase network by the normalization module 14. The normalization module 14 receives as input the three voltages $VE_a$, $VE_b$, $VE_c$ between each input terminal of the device and a phase corresponding to the neutral phase of the three-phase network. The normalization module 14 then performs, according to known techniques, for example according to techniques of "phase-locked loop" or "PLL" type, a filtering of each of the input signals so as to obtain a sinusoidal signal having the same frequency as the main harmonic of the measured signal.

The normalization module then determines the order in which the three signals should be numbered so as to have a first signal in the form $V_m \sin(\omega t)$, a second signal $Ve_2$ equal to the signal Vei phase-shifted by $-2\pi/3$, and a signal $Ve_3$ equal to the signal Vei phase-shifted by $+2\pi/3$.

The normalization module 14 then sends to the regulating unit 15 the current characteristics making it possible for the regulating unit 15 to reconstruct a voltage vector $\vec{V}=(Vei, Ve_2, Ve_3)=V_m(\sin(\omega t), \sin(\omega t-2\pi/3), \sin(\omega t+2\pi/3))$, that is to say, the amplitude Vm, the pulsing ω of the voltage, and the origin of the times chosen for the first term Vei to have a zero phase.

The normalization module 14 also returns the order in which the three terminals $B_1$, $B_2$, $B_3$ should be numbered so that the three terms of the vector present between them the phase shift specified above.

The regulating unit 15 receives, from three current intensity sensors, three values measured at each of the terminals $B_1$, $B_2$, $B_3$ representing three currents $Ie_1$, $Ie_2$, $Ie_3$ entering into the device. The regulating unit 15 arranges the three values $Ie_1$, $Ie_2$ and $Ie_3$ to obtain a current vector $(Ie_1, Ie_2, Ie_3)$ such that the intensity Iei is the intensity passing through the terminal Bi corresponding to the filtered voltage $Ve_1$, that the intensity $Ie_2$ is the current passing through the terminal $B_2$, the filtered voltage of which corresponds to $Ve_2$ and that the intensity $Ie_3$ is the current passing through the terminal $B_3$, the filtered voltage of which corresponds to $Ve_3$.

There is no departure from the framework of the invention if the order assigned to the three filtered voltage values is different from that defined above.

However, the following equations will have to be adapted accordingly, in particular for the expression of the reference frame change matrix T(ωt) defined later.

The indices 1, 2, 3 corresponding to a renumbering of the phases of the three-phase network may correspond, in order, to the indices a, b, c or may be a permutation thereof.

Hereinafter in the reasoning, the identifications of the terminals Bi, $B_2$, $B_3$ connecting the device 1 to the three-phase network, as well as the numbering which evolves therefrom, for the connection points $D_1$, $D_2$, $D_3$, the branches $F_1$, $F_2$, $F_3$, the voltages $Vf_1$, $Vf_2$, $Vf_3$, the current intensities $Ie_1$, $Ie_2$, $Ie_3$, Ifi, $If_2$, $If_3$, presupposes that the terminals $B_1$, $B_2$, $B_3$ have been numbered by the normalization module 14 according to the above principle.

The normalization module 14 sends the three modeled voltage values $Ve_1$, $Ve_2$, $Ve_3$, to the regulating unit 15, which must then generate chopping duty cycle setpoint values for the buck stage 3 and for the boost stage 4, making it possible to satisfy three objectives:

- to minimize the phase-shift between the currents $Ie_1$, $Ie_2$, $Ie_3$ measured through terminals $B_1$, $B_2$, $B_3$ connecting to the three-phase network, and the three modeled voltage values $Ve_1$, $Ve_2$, $Ve_3$ at the corresponding terminals of the device,
- to obtain a measured current $I_{batt}$ entering via the "+" terminal of the battery 13, corresponding to the power supply needs of the battery, these needs being determined by the charge monitoring module 19 and delivered as function $I_{batt}^{ref}$ to the regulating unit 15,
- to avoid a cancellation of the current Id passing through the induction winding Ld of the electrical machine 5, in order not to generate undesirable harmonics in the current taken from the network.

For this, a voltage vector $\vec{V}e$ is considered that has, in an initial base, the coordinates $Ve_1$, $Ve_2$ and $Ve_3$, that is to say $\vec{V}e=(Vei, Ve_2, Ve_3)$ in this first base.

In the same base (which could equally be expressed as "in the same reference frame"), the following are considered: an intensity vector of current entering into the device 1: $\vec{I}e=(Ie_1, Ie_2, Ie_3)$, and an output intensity vector of the filter 2: $\vec{I}f)Ifi, If_2, If_3)$, as well as a voltage vector at the terminals of the filtering capacitors C of the filter 2: $\vec{V}f=(Vf_1, Vf_2, Vf_3)$.

Hereinbelow, we use "s" to denote the derivation operator relative to the time "t", i.e.

$$\frac{d}{dt} = s,$$

which can also be expressed, in complex notation and for sinusoidal pulsing currents ω, s=jω.

The relationships between current and voltage of each of the branches of the filter 2 are written:

$$\vec{V}e = L_2 \cdot s - (L_1 \cdot s + R)/(L_2 \cdot s + L_1 \cdot s + R) \cdot \vec{i}e + \vec{V}f$$

and $$C \cdot s \cdot \vec{V}f = \vec{i}e - \vec{i}f$$

or even:

$$[(L_1+L_2) \cdot s+R] \cdot (\vec{V}e - \vec{V}f) = (L_1 \cdot L_2 s^2 + R \cdot L_2 \cdot s) \cdot \vec{i}e \quad \text{equation (1)}$$

and $$C \cdot s \cdot \vec{V}f = \vec{I}e - \vec{I}f \quad \text{equation (2)}$$

the equation of the branch bearing the electrical machine 5 is written:

$$Rd \cdot Id + Ld \cdot s \cdot Id = \vec{a} - \vec{V}f - a_s \cdot V_{batt},$$

in which $\vec{a}=(ai, a_2, a_3)$ is the vector defined in the initial base by the chopping duty cycles (PWM) of the buck stage 3.

Which can also be written:

$$Rd \cdot Id + Ld \cdot s \cdot Id = (ff - \vec{V}f - I_{batt} \cdot V_{batt})/Id$$

or even:

$$Rd \cdot Id^2 + Ld/2 \cdot s \cdot (Id^2) = if - \vec{V}f - I_{batt} - V_{batt}$$

A variable change matrix T(ωi) (that can equally be called base change matrix or reference frame change matrix) is defined from the vector $\vec{V}e$ in the form:

$$T(\omega t) = \frac{2}{3}\begin{bmatrix} \sin(\omega t) & \sin\left(\omega t - \frac{2\pi}{3}\right) & \sin\left(\omega t + \frac{2}{3}\right) \\ \cos(\omega t) & \cos\left(\omega t - \frac{2\pi}{3}\right) & \cos\left(\omega t + \frac{2\pi}{3}\right) \\ \frac{1}{2} & \frac{1}{2} & \frac{1}{2} \end{bmatrix}$$

This matrix represents a change of base between an initial base, and a rotating arrival base, defined by three vectors $\vec{u}_1$, $\vec{u}_2$, $\vec{u}_3$ whose coordinates in the initial base are respectively:

$$\vec{u}_1 = \left(\sin(\omega t), \sin\left(\omega t - \frac{2\pi}{3}\right), \sin\left(\omega t + \frac{2\pi}{3}\right)\right)$$

$$\vec{u}_2 = \left(\cos(\omega t), \cos\left(\omega t - \frac{2\pi}{3}\right), \cos\left(\omega t + \frac{2\pi}{3}\right)\right)$$

$$\vec{u}_3 = (i, i, 1)$$

In other words, $\hat{u}_1$ is colinear to $\vec{V}e$ and rotates with $\vec{V}e$ in the starting base, $\hat{u}_2$ is at right angles to $\vec{V}e$ and rotates with $\vec{V}e$ in the starting base, $\vec{u}_3$ is at right angles to $\vec{u}$, and to $\hat{u}_2$ and remains fixed in the starting base.

The matrix $T^{-1}(\omega i)$ which, multiplied by T(ωi), makes it possible to retrieve the identity matrix, is given by:

$$T^{-1}(\omega t) = \begin{bmatrix} \sin(cet) & \cos(\omega t) & 1 \\ \sin\left(\omega t - \frac{2\pi}{3}\right) & \cos\left(\omega t - \frac{2\pi}{3}\right) & 1 \\ \sin\left(\omega t + \frac{2\pi}{3}\right) & \cos\left(\omega t + \frac{2\pi}{3}\right) & 1 \end{bmatrix}$$

The matrix T(ωi), and the first and second derivatives relative to time of its inverse matrix $T^{-1}$(rot), have the following noteworthy properties:

$$T(\omega t) \cdot \frac{d}{dt}(T^{-1}(\omega t)) = T(\omega t) \cdot s(T^{-1}(\omega t)) = \begin{bmatrix} 0 & -\omega & 0 \\ \omega & 0 & 0 \\ 0 & 0 & 0 \end{bmatrix}$$

$$T(\omega t) \cdot \frac{d^2}{dt^2}(T^{-1}(\omega t)) = T(\omega t) \cdot s^2(T^{-1}(\omega t)) = \begin{bmatrix} -\omega^2 & 0 & 0 \\ 0 & -\omega^2 & 0 \\ 0 & 0 & 0 \end{bmatrix}$$

The following notations will be used hereinbelow:

$Vei_23=(Vei, Ve_2, Ve_3)=Vm$ (sin (rot), sin (ωi−2π/3), sin (ωi+2π/3), which is the expression of $\vec{V}e$ in the starting base, $$Ve_{dqo}=T(\omega i)*Vei_{23}=(Ve_d, Ve_q, Ve_0)=(Vm,0,0)$$

which is the expression of $\vec{V}e$ in the rotating base defined by the vectors $\vec{u}_1$, $\vec{u}_2$, $\vec{u}_3$, $Iei_{23}=(Iei,Ie_2,Ie_3)=Im(\sin(\omega i-\phi),\sin(\omega i-\phi-2\pi/3),\sin(\text{rot}-\phi+2\pi/3))$, which is the expression of $\vec{I}e$ in the starting base, $\Phi$ being the phase shift of the current relative to the voltage at each terminal connecting the device 1 to the three-phase network, $$Iedqo=T(\text{rot})*Ie_{123}=(Ied,Ie_q,Ie_0)=Im(\cos\varphi_p,\sin\varphi,0),$$

which is the expression of $\vec{I}e$ in the rotating base defined by the vectors $\vec{u}_1$, $\vec{u}_2$, $\vec{u}_3$.

In practice, given the way in which the rotating base $\vec{u}_1$, $\vec{u}_2$, $\vec{u}_3$ is defined, $\vec{V}e$ is fixed in the rotating base and the current vector $\vec{I}e$ is also fixed in the rotating base and can be written, if the current in each phase is phase shifted relative to the phase voltage via an angle $\Phi$: $Ie_{dqo}=(Ied, Ie_q, Ie_0)=Im(\cos\varphi, \sin\varphi, 0)$, in other words, reducing the phase shift between the current and the voltage taken from the network amounts to cancelling the following component $\vec{u}(Ie)$, that is to say cancelling the component $Ie_q$.

The following notations are also used:

If123=(If$_i$, If$_2$, If3) which is the expression of $\vec{If}$ in the starting base, I fdqo=T($\omega$t)*If$_{12}$3=(Ifd, If$_q$, If$_0$)) which is the expression of $\vec{If}$ in the rotating base defined by the vectors $\vec{u}_1$, $\vec{u}_2$, $\vec{u}_3$, Vf$_{123}$=(Vfi, Vf$_2$, Vf$_3$) which is the expression of $\vec{Vf}$ in the starting base, Vfdqo=T(rot)*Vf=(Vf$_d$, Vf$_q$, Vf$_0$) which is the expression of $\vec{Vf}$ in the rotating base defined by the vectors $\vec{u}_1$, $\vec{u}_2$, $\vec{u}_3$.

Writing the characteristic equations of the filter 2 in the rotating base amounts to multiplying on the left by T($\omega$t) the equations (1) and (2) expressed in the starting base. The following are then obtained:

$$(L_1+L_2)\cdot T(\omega t)\cdot s\cdot(Ve_{123}-Vf_{123})+R\cdot\tau(\omega t)\cdot(Ve_{123}-Vf_{123})=(L_1\cdot L_2)\cdot T(\omega t)\cdot(s^2\cdot Ie_{123})+R\cdot L_2\cdot T(\omega t)\cdot(s\cdot Ie_{123})$$

and $$C\cdot T(\omega t)\cdot(s\cdot Vf_{123})=T(\omega i)\cdot Ie_{123}-\tau(\omega t)\cdot If_{123}.$$

which can also be written as a function of the expressions of the different vectors in the rotating base:

$$(L_1+L_2)\cdot T(\omega i)\cdot s\cdot(T^{-1}(\omega t)(Ve_{dqo}-Vf_{dqo}))+R\cdot(Ve_{dqo}-Vf_{dqo})-(L_1\cdot L_2)\cdot T(\omega t)\cdot(s^2\cdot T^{-1}(\omega t)(Ie_{dqo}))+R\cdot L_2\cdot T(\omega i)\cdot s\cdot\tau^{-1}(\omega t)ie_{dqo})$$

and $$C\cdot T(\omega t)\cdot(s\cdot T^{-1}(\omega t))(Vf_{dqo})=Ie_{dqo}-T\{\text{at}\}-If_{dqo}$$

Since the coordinates according to the vector $\vec{u}_3$ are cancelled, the following equations are obtained concerning the following coordinates of the vectors $\vec{u}_1$ and $\vec{u}_2$:

$$\begin{bmatrix} (L_1+L_2)s+R & -(L_1+L_2)\omega \\ (L_1+L_2)\omega & (L_1+L_2)s+R \end{bmatrix}\begin{pmatrix} Ve_d-Vf_d \\ Ve_q-Vf_q \end{pmatrix} =$$
$$\begin{bmatrix} L_1L_2s^2+RL_2s- & -L_2(2L\hat{\ }s+R) \\ L_1L_2\omega^2 & L_1L_2s^2+RL_2s- \\ L_2(2L_1\omega s+R) & L_1L_2\omega^2 \end{bmatrix}\begin{pmatrix} Ie_d \\ Ie_q \end{pmatrix} \quad \text{equation (3)}$$

and $$\begin{bmatrix} Cs & -C\omega \\ C\omega & Cs \end{bmatrix}\begin{pmatrix} Vf_d \\ Vf_q \end{pmatrix}=\begin{pmatrix} Ie_d-If_d \\ Ie_q-If_q \end{pmatrix} \quad \text{equation (4)}$$

By eliminating the voltage terms Vf$_d$ and Vf$_q$ between the equations (3) and (4), an equation is obtained of the following form linking Ie$_q$, If$_q$ and If$_d$:

$$Ie_q=FA(s)If_q+FB(s)If_d$$

in which FA(s) is a transformation function of If$_q$ which is deduced from the equations (3), and (4), and FB(s) is a transformation function of the function If$_d$ which is also deduced from the equations (3) and (4). It is found that, for the pulsing $\omega$ of the electrical network close to $\omega=2\pi\times50$ or $\omega=2\pi\times60$, and for the orders of magnitude of the resistors R, Rd, of the capacitors C and of the inductors L$_1$, L$_2$, Ld mentioned above, the transformation FB(s) applied to a current value I delivers negligible values compared to the values derived from the transformation FA(s) applied to the same current I.

It can be deduced therefrom that it is possible to use the variable If$_q$ of current passing between the filter 2 and the buck stage 3, as control variable for slaving the current component Ie$_q$ to 0, and thus cancelling the phase shift between the currents and the voltages at the input of the charging device.

According to the approximation:

$$Ie_q=FA(s)If, \quad \text{equation (5)}$$

The equation of the branch containing the electrical machine 5 makes it possible to propose a relationship linking Id and If$_d$. In fact it is written:

$$Rd-Id^2+Ld/2-s-(Id^2)=ff-\vec{V}f-I_{batt}-V_{batt}$$

or even:

$$Rd-Id^2+Ld/2-s-(Id^2)=If_dVf_d-If_qVf_q-I_{batt}-V_{batt} \quad \text{equation (6)}$$

By considering that the product $I_{batt}\times V_{batt}$ is a disturbance of variation much slower than the input current values that are to be regulated, and by considering that the component Vf$_q$ of the vector of the voltages at the terminals of the capacitors is zero—because little different, because of the values R, L$_1$, L$_2$ of the filter, from Ve$_q$—a relationship is obtained from the equation (6) that directly links the variations of If$_d$ and of Id.

It is therefore possible to use the current variable If$_d$ as control variable for slaving the current Id passing through the electrical machine 5, to a setpoint value which will be generated in such a way as to not allow the cancellation of the current in the induction winding Ld.

If$_d$ and If$_q$ can therefore both be used as control variables for respectively slaving the current Id passing through the electrical machine and the current Ie$_q$ transmitted between the filter and the buck stage 3, each to a reference setpoint value.

In order to know the chopping duty cycle values ai, a$_2$ and a$_3$ making it possible to obtain the desired values If$_d$ and If$_q$, it is sufficient to perform a change of reference frame using the matrix T$^{-1}$($\omega$i) in order to recalculate, from If$_d$ and If$_q$, the three coordinates Ifi, If$_2$, If$_3$ of the currents transmitted between the filter 2 and the buck stage 3. By dividing these three values Ifi, If$_2$ and If$_3$ by the value Id of current measured through the electrical machine 5, the three chopping duty cycle values ai, a$_2$ and a$_3$ of the buck stage 3 are obtained by definition. The control of the buck stage 3 using these three chopping duty cycle setpoints makes it possible to slave $Ie_q$ to a zero reference, in order to cancel the phase shift between current and voltage at the input of the device, and slave Id, the current passing through the electrical machine 5, to the desired setpoint value $Id^{ref}$.

If $Ie_q$ is regulated by $If_q$ to cancel the phase shift Φ, and Id is regulated by $If_d$ to avoid the cancellation of the current in the winding of the electrical machine, the third objective of the regulation performed by the regulating unit 15 then remains to be satisfied, that is to say slaving the current entering into the battery $I_{batt}$, to the setpoint value $I_{batt}^{ref}$ delivered by the charge monitoring module 19. For this, it is possible, for example, to impose a chopping duty cycle $a_s$ on the boost stage 4 so as to observe the relationship $a_s = I_{batt}^{ref}/Id$. In order to compensate the time offset between the moment when the $I_{batt}$ and Id values are measured, and the moment when the control variable $a_s$ defining the chopping duty cycle of the boost stage 4 becomes effective, a control loop of "feed forward" type can be used, calculating the control variable $a_s$ from the sum of the setpoint current $I_{batt}^{ref}$ and of the integrated error between the setpoint current $I_{batt}^{ref}$ and the current actually measured $I_{batt}$ at the +terminal of the battery 13.

According to another variant embodiment, the equations (3) and (4) can be used in order to write, by eliminating the terms $Vf_d$ and $Vf_q$, a relationship between Iea, $If_q$ and $If_d$ in the form:

$$Ie_d = FE(s)(If_q) + FD\{sIIf_d\}$$

It is observed this time, with the usual network pulsing values and with the values of the resistors R, Rd, of the capacitors C and of the inductors $L_1$, $L_2$, Ld, that the term FD(I fd) is predominant compared to the term $FE(If_q)$. It is then possible to write as a first approximation:

$$Ie_d = FD(If_d) \qquad \text{equation (6)}$$

It is therefore possible, according to this other variant embodiment, to use the current values $If_q$ and $If_d$ to simultaneously slave $Ie_q$ and $Ie_d$ to two respective setpoint values. $Ie_q$ will, as previously, be slaved to zero to cancel the phase shift Φ, and $Ie_d$ will be slaved to a setpoint value $Ie_d^{ref}$, generated to obtain the setpoint intensity $I_{batt}^{ref}$ at the input of the +terminal of the battery 13. As previously, a change of reference frame will be performed using the matrix $T^{-1}(\omega i)$ in order to calculate, from the desired control values $If_q$ and $If_d$, the values to be applied $a_1$, $a_2$, $a_3$ as chopping duty cycle setpoint, to the buck stage 3.

In this second embodiment, a regulating loop on $If_q$ for regulating $Ie_q$, and a regulating loop on $If_d$ for regulating the current arriving at the battery are used jointly. It therefore remains to define a third regulating loop making it possible to slave the current passing through the electrical machine 5.

Now, as first approximation, the relationship translating the dynamics of the current through the electrical machine 5, i.e.:

$$Rd \cdot Id + Ld \cdot s \cdot Id = \vec{a} - \vec{V}f - a_s \cdot V_{batt} \qquad \text{equation (7)}$$

directly links $a_s$ and the current Id passing through the electrical machine 5, because:

- $\vec{a} - \vec{V}f$ can be considered as a disturbance, the values of which are determined by the first two regulating loops and
- $V_{batt}$ is a relatively stable value by virtue of the presence of the capacitor 12.

It is therefore possible, in this second embodiment, to control $a_s$ directly from the error between a reference value $Id^{ref}$, and the measured value Id passing through the electrical machine 5.

The values used as setpoints are the zero value for $Ie_q$, and two setpoint intensity functions $Ie_q^{ref}$ and $Id^{ref}$ generated by the reference guide module 18, respectively for $Ie_q$ and Id.

To determine the setpoint $Ie_d^{ref}$ of current entering into the device, the conservation of the electrical power between the three-phase network connection terminals and the terminals of the battery is expressed. For this, electrical energy losses in the device, notably linked to the presence of resistors, are disregarded in a first approximation.

The incoming current setpoint value $Ie_d^{ref}$ is then given by the relationship:

$$Ie_d^{ref} = \tfrac{2}{3} \cdot I_{batt}^{ref} \cdot V_{batt}/Vm \qquad \text{equation (8)}$$

in which

Vm is the amplitude of the input voltage (network voltage);
$V_{batt}$ is the voltage measured at the terminals of the battery 13;
$I_{batt}^{ref}$ is the battery current setpoint, generated by the charge monitoring module 19.

The setpoint $Id^{ref}$ of current passing through the electrical machine 5, intended to avoid a cancellation of current in the inductance of the electrical machine, can either be fixed at an arbitrary constant, or follow any function remaining constantly greater than zero.

In the embodiments described, a decision is made to adjust $Id^{ref}$ as a function of the setpoint currents $Ie_d^{ref}$ at the input of the device and $I_{batt}^{ref}$ at the terminals of the battery 13, according to the following formula:

$$Id^{ref} = \text{Max}\{Ie_d^{ref}, I_{batt}^{ref}\} + A \qquad \text{equation (9)}$$

In which $Ied^{ref}$ is given by the above relationship $I_{batt}^{ref}$ is the battery current setpoint delivered by the charge monitoring module 19, and A is an arbitrary constant that can, for example, be fixed at a value of 200 amperes.

The reference guide module 18 of FIG. 1, associated with the control modules 16 and 17, the operation of which is detailed below, therefore systematically calculates $Ie_d^{ref}$ according to the equation (8), and then calculates $Id^{ref}$ according to the equation (9). Depending on the operating modes retained for each module 16 and 17, the guide module 18 sends one of the values $Ie_d^{ref}$ or $Id^{ref}$ to the module 16, or to the module 17, and possibly sends the other of the two values to the other module. There is, however, no departure from the framework of the invention if the reference guide module calculates and transmits only one of the values $Ie_d^{ref}$ or $Id^{ref}$.

FIGS. 2a, 2b and 3a, 3b illustrate two regulating modes retained for implementing the invention on the basis of the above considerations, by using a charging device 1 corresponding to FIG. 1. FIGS. 2a, 2b and 3a, 3b contain references common to FIG. 1, the same elements being designated by the same references.

Figure 2A:
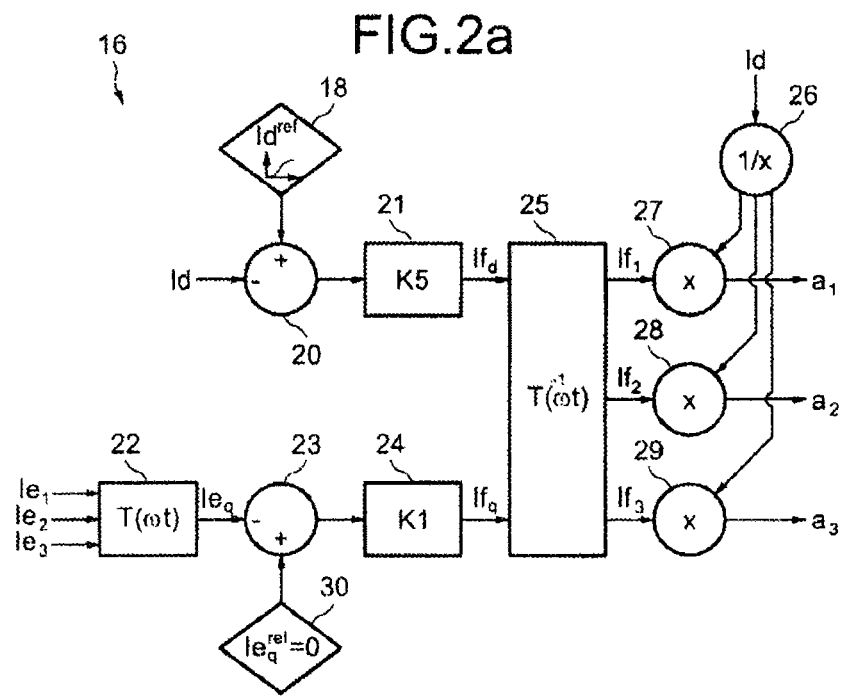
FIGS. 2a and 2b illustrate two regulating subassemblies of a recharging device according to the invention.

FIG. 2a illustrates a possible operating mode of the control module 16. The control module 16 receives, on a first input, the measured value Id of current intensity passing through the electrical machine 5. It sends this value to a negative input of a subtractor 20, which receives on a positive input a current setpoint value $Id^{ref}$ generated by the reference guide module 18. The difference is sent to a corrector 21 which can be a corrector of proportional integral derivative type, the correction function of which is here denoted K5, and the terms of which can be deduced from the equation (6).

The result of this correction is interpreted as a component $If_d$ following the vector $\hat{u}_1$ the rotating base, parallel to the filtered voltage vector $\vec{V}e$ having been used to define the change of reference frame, of a setpoint current at the output of the filter 2. The control module 16 receives, on three other inputs, measured values $Ie_1$, $Ie_2$, $Ie_3$ of the currents at the input terminals $B_1$, $B_2$, $B_3$ of the device 1, and uses these three values as the three coordinates of a current intensity vector $\vec{I}e$, to which it applies, by an operator 22, a change of reference frame, to obtain one of the coordinates of the vector $\vec{I}e$ in the rotating base defined by the base change matrix $T(\omega i)$. The coordinate retained $Ie_q$ is a coordinate according to the vector $\hat{u}_2$ at right angles to the filtered voltage vector $\vec{V}e$ having been used to define the change of reference frame. This coordinate $Ie_q$ is sent to a negative input of a subtractor 23 which receives, on a positive input, a setpoint $Ie_g^{ref}$ equal to zero stored in a memory 30 of the control module 16.

The difference is sent to a corrector 24 also of the proportional integral derivative type, here represented by a correction function K1, the terms of which can be deduced from the equation (5).

The result of the corrector 24 is interpreted as a current intensity $If_q$ corresponding to a coordinate according to the vector $\hat{u}_2$ at right angles to the filtered voltage vector $\vec{V}e$ having been used to define the change of reference frame. The results $If_d$ of the corrector 41 and $If_q$ of the corrector 24 are then used as two components in the rotating base, of a vector $\vec{I}/=(If_d, If_q, 0)$ representing a setpoint vector for the intensity of the current outgoing from the filter 2. For this, the reverse base change matrix $T^{-1}(\omega i)$ is applied to this vector $(If_d, If_q, 0)$ by means of an operator 25, which delivers three coordinates $Ifi$, $If_2$, $If_3$ representing $\vec{I}/$ in the starting base, that is to say representing three setpoint values of the currents outgoing from the filter 2 and passing respectively through the branches F1, F2, F3 of FIG. 1. The control module 16 then divides, using a value inverter 26 and three multipliers 27, 28, 29, each of the values $Ifi$, $If_2$, $If_3$ by the value Id of current passing through the electrical machine 5, and thus delivers three values $ai$, $a_2$ and $a_3$ which make it possible, according to known methods, to control the buck stage 3. The values $ai$, $a_2$ and $a_3$ are, for example, sent to a control module (not represented) which imposes on the switches of the buck stage 3, the opening and closure cycles making it possible to obtain these chopping duty cycles.

Figure 2B:
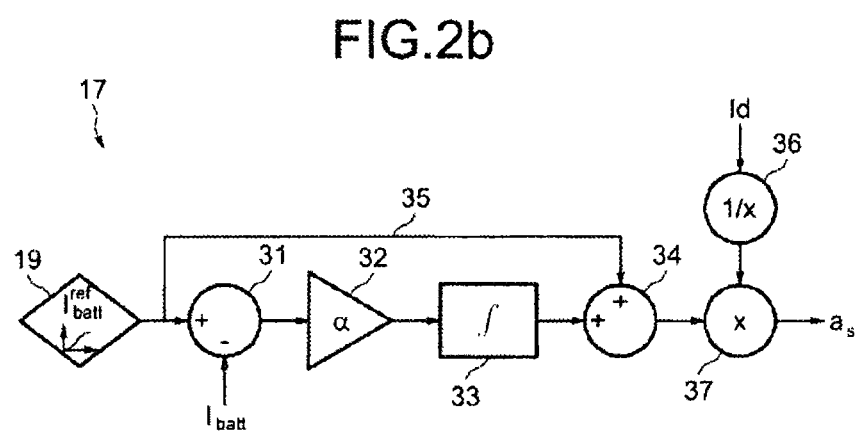

FIG. 2b illustrates a possible mode of operation of a control module 17 making it possible to control the boost stage 4 together with the control module 16, the mode operation of which is described in FIG. 2a. The control module 17 receives a measured value $I_{batt}$ on one of its inputs, and sends it to the negative input of the subtractor 31, which receives on its positive input the value $I_{batt}^{ref}$ delivered by the charge monitoring module 19. The difference between the two terms is sent by the subtractor 31 to a first corrector 32 of proportional type, then to a second corrector 33 of integrator type. The current setpoint value $I_{batt}^{ref}$ is simultaneously sent via a loop of "feed forward" type 35, to a summer 34 which receives, on a second input, the result of the integrator 33.

On a third input, the control module 17 receives the measured value Id of current passing through the electrical machine 5, sends this value to an inverting operator 36, then to a multiplier 37 which receives, on its second, the result of the summer 34. The result of the multiplier 37, which is therefore the battery setpoint current increased by a corrected error term, divided by the current Id passing through the electrical machine 5, is sent as chopping duty cycle setpoint value $a_s$, to a control module (not represented) which imposes, according to known methods, on switches of the boost stage 4, the opening and closure cycles making it possible to obtain this chopping duty cycle.

Correction types other than the proportional correction of the corrector 32 and the proportional correction of the integrator 33 can be envisaged, the purpose of the correction loop being to compensate the time offset between the moment when the control values Id and $I_{batt}^{ref}$ are determined, and the moment when the chopping duty cycle corresponding to $a_s$ is applied.

The operating modes described in FIGS. 2a and 2b are complementary: the operating mode described in FIG. 2a makes it possible, by controlling the buck stage 3, to cancel the phase shift between the current and the voltage taken from the network, and also makes it possible to obtain a current intensity Id passing through the electrical machine, which is non-zero, and which is compatible with the current $I_{batt}^{ref}$ that is ultimately required at the input of the battery 13.

The operating mode of the control module 17 described in FIG. 2b then makes it possible, by slaving $I_{batt}$ to $I_{batt}^{ref}$ to exploit the current Id passing through the electrical machine, and regulated by the module 16, so as to obtain the desired current $I_{batt}^{ref}$ at the input of the battery 13.

Figure 3A:
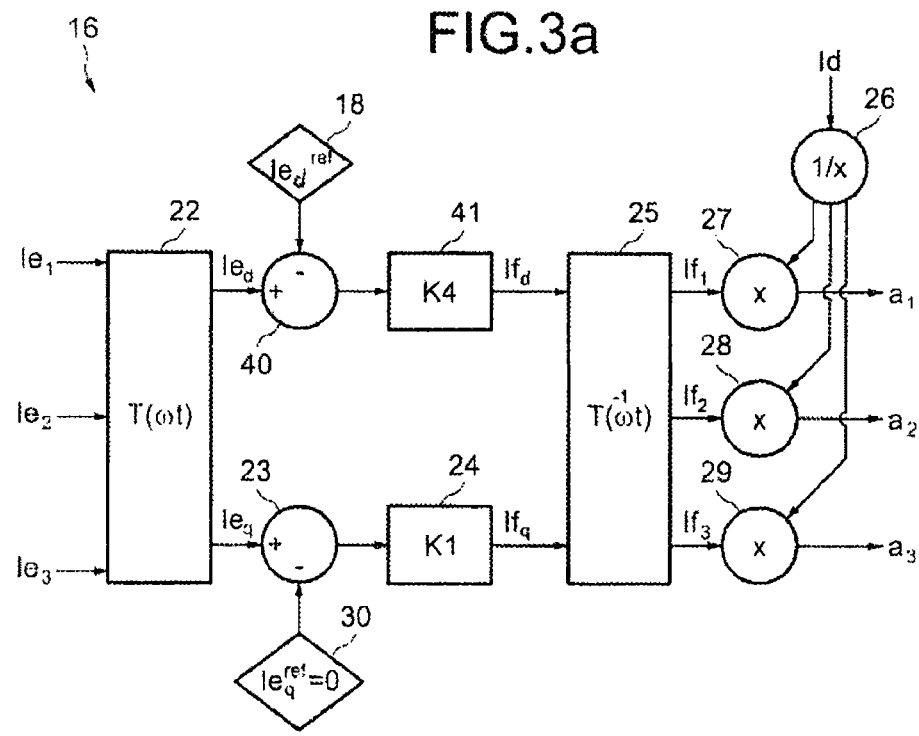
FIGS. 3a and 3b illustrate two other regulating subassemblies of a recharging device according to another embodiment of the invention.

FIG. 3a illustrates another possible operating mode of the control module 16, making it possible to control the buck state 3 of FIG. 1. As in the operating mode of FIG. 2a, the three values $Ie_1$, $Ie_2$, $Ie_3$ constituting the coordinates of vector $\vec{I}e$ of current intensities entering via the terminals $B_1$, $B_2$, $B_3$ of the device 1, are transformed by an operator 22 which multiplies them by the reference frame change matrix $T(\cot)$.

The operator 22 this time delivers two coordinates $Ie_q$ and $Ie_d$ of the current entering via the terminals of the three-phase circuit, which are the coordinates of the vector $\vec{I}e$ in the plane of rotation defined by the vectors $\hat{u}_1$, $\hat{u}_2$, of the filtered voltage vector at the input of the device. The coordinate $Ie_q$, which is the coordinate at right angles to the filtered voltage vector is, as in the regulating mode of FIG. 2a, sent to a subtractor 23, which subtracts from it a setpoint value $Ie_q^{ref}$ stored in a memory 30 and equal to zero, and sends the difference to a corrector 24 represented by the correction function K1, which can be the same as that of FIG. 3a.

The corrector 24 delivers a value $If_q$ which is then used as a component of a current setpoint vector $\vec{I}/$ at the input of the buck stage 3. In the regulating mode of FIG. 3a, the operator 22 sends the second coordinate $Ie_d$ of current entering into the device, which is the coordinate which is the coordinate according to the vector $\hat{u}_1$ parallel to the filtered voltage vector $\vec{V}e$, to a subtractor 40 which subtracts from it a setpoint value $Ied^{ref}$ generated by the reference guide module 18 of FIG. 1.

The difference is sent to a corrector 41 represented by a correction function K4 which can be of proportional integral derivative type and the terms of which can be deduced from the equation (6).

The corrector 41 delivers a value $If_d$ which is interpreted as a setpoint value of the coordinate parallel to the vector $\vec{V}e$ of filtered voltages at the input of the device, of the vector $\vec{I}$/ defining the three currents entering via the terminals of the buck stage 3. If$_q$ is interpreted as the coordinate according to the second base vector û$_2$ of the rotating base, at right angles to the vector $\vec{V}$e of filtered voltages at the input of the device, of the vector $\vec{I}$/ of the intensities entering into the buck stage 3. The two coordinates Ifd and If$_q$ are respectively sent by the correctors 41 and 24 to an operator 25 which multiplies them by the inverse base change matrix T$^{-1}$(ωi). The operator 25 delivers three coordinates If$_1$, If$_2$ and If$_3$ of in the starting base, translating the setpoint current intensity values that are desired respectively in the input branches Fi, F$_2$, F$_3$ of the buck stage 3.

As in the regulating mode of FIG. 2a, the three setpoint values Ifi, If$_2$, If$_3$ are then divided by means of an inverting operator 26 and three multiplying operators 27, 28 and 29, by the measured value Id of current passing through the electrical machine 5. The control module 16 then delivers three setpoint values ai, a$_2$, a$_3$, used by a control module (not represented) as chopping duty cycle setpoints for controlling the buck stage 3.

Figure 3B:
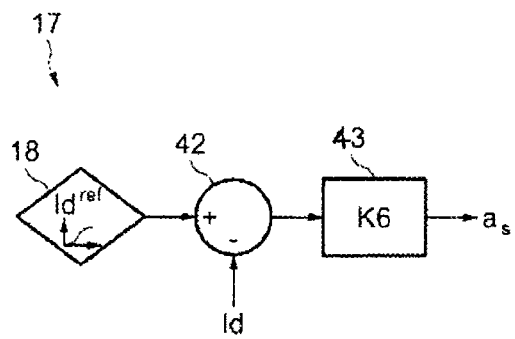

FIG. 3b illustrates a regulating mode by the module 17 which is complementary to the regulating mode by the module 16 described in FIG. 3a. The control module 17 receives here, on a first input, the measured value Id of the current passing through the electrical machine 5, sends it to the negative input of a subtractor 42 which receives, on a positive input, a setpoint value Id$^{ref}$ generated by the reference guide module 18.

The difference between the measured value Id and the setpoint value Id$^{ref}$ is sent to a corrector 43, for example of proportional integral type, and represented by a correction function K6, the terms of which can be deduced from the equation (7). The corrector 43 delivers a value a$_s$ that the control module 17 sends to a control module (not represented) to define the opening and closure cycles of the switches forming part of the boost stage 4.

The object of the invention is not limited to the embodiments described, and can be broken down into numerous variants, notably with regard to the form of the modeled vector $\vec{V}$e of the incoming voltages, and the base change matrix evolving therefrom.

A different filter architecture can be used at the input of the buck stage 3, the terms of the equations (3) and (4) then being modified, but the change of reference frame remaining possible, with the same advantages as described above.

Multivariable commands can be envisaged, in which three regulation loops, or more would be interdependent to jointly deliver the four chopping duty cycle setpoint values a$_1$, a$_2$, a$_3$, a$_s$.

The architecture of the device 1 can vary, subject to retaining the succession of filter-buck stage-induction winding-boost stage-battery. It will be noted in particular that the branches Fi, F$_2$, F$_3$ can be reduced to the connection points D$_1$, D$_2$, D$_3$.

The charging device according to the invention makes it possible to reconcile, at each instant, the power supply needs of the battery, and the requirements of the three-phase current supplier in terms of reactive power and harmonics of the current delivered.

LIST OF REFERENCES

1 Charging device
2 Filter
3 Buck stage
4 Boost stage
5 Electrical machine
6, 7, 8 Parallel branches of the buck stage 3
9 Diode
10 First connection terminal of the boost stage 4
11 Second connection terminal of the boost stage 4
12 Capacitor
13 Battery
14 Normalization module
15 Regulating unit
16, 17 Control modules
18 Reference guide module
19 Charge monitoring module
20 Subtractor
21 Corrector
22 Reference frame change operator (=base change operator)
23 Subtractor
24 Corrector
25 Reference frame change operator (=base change operator), the inverse of the operator 22
26 Inverter
27, 28, 29 Multipliers
30 Memory
31 Subtractor
32 Corrector
33 Integrating corrector
34 Summer
35 "feed forward" loop
36 Inverter
37 Multiplier
40 Subtractor
41 Corrector
42 Subtractor
43 Corrector
a Correction factor of the corrector 32
ai, a$_2$, a$_3$ Chopping duty cycles of the buck stage 3 defined by ai=Ifi/Id, a$_2$=If$_2$/Id, a$_3$=If$_3$/Id
a$_s$ Chopping duty cycle of the boost stage 4 defined by a$_s$=I$_{batt}$/Id
Bi, B$_2$, B$_3$ Terminals for connecting the device 1 to the phases of the three-phase network
C Capacitors of the filter 2, of value C
Di, D$_2$, D$_3$ Points of connection of the filter 2 to the inputs of the buck stage 3
Fi, F$_2$, F$_3$ Branches or points of connection between the inputs of the buck stage 3, and the midpoint (point between two switches) of each branch 6, 7, 8 of the buck stage 3
Li First series of inductors of the filter 2, of value Li
L$_2$ Second series of inductors of the filter 2, of value L$_2$
R Resistors of the filter 2, of value R
Rd Equivalent resistance of the windings of the electrical machine 5
Ld Equivalent inductance of the windings of the electrical machine 5
Iei, Ie$_2$, Ie$_3$ Measured values of current entering via the terminals B$_1$, B$_2$, B$_3$ into the charging device
Ifi, If$_2$, If$_3$ Currents entering via the branches F$_1$, F$_2$, F$_3$ into the buck stage 3 from the filter 2
Id Measured current passing through the electrical machine 5
I$_{batt}$ Measured current entering via the "+" terminal of the battery 13
I$_{batt}$$^{ref}$ Battery current intensity setpoint sent by the charge monitoring module 19

$Ie_d$ Projection of the vector $\vec{I}e=(Ie_1, Ie_2, Ie_3)$ expressed in the starting base on the first vector $\hat{u}_1$ of the rotating base Ifd Projection of the vector $\vec{I}f$ equal to $If_1, If_2, If_3$) expressed in the starting base on the first vector $\vec{u}_1$ of the rotating base K1, K4, K5, K6 Correction functions of the correctors 24, 21, 41 and 43

$T(\omega i)$ Base change matrix between an initial reference frame in which the voltages at the input terminals of the device define a vector $\vec{V}e=(Vei, Ve_2, Ve_3)$, and a reference frame defined by an orthogonal rotating base, a first base vector $\vec{u}_1$ of which is colinear to the vector $\vec{V}e$ and a third base vector is fixed relative to the starting base.

$T^{-1}(\omega i)$ Inverse base change matrix, between the reference frame defined by the rotating base and the initial reference frame $VE_a, VE_b, VE_c$ Voltage measured between the ground and each of the terminals connecting the charging device to the three-phase network Vei, $Ve_2, Ve_3$ Voltage values filtered by the normalization module 14 from measured voltage values $VE_a, VE_b, VE_c$, rearranged from 1 to 3 to obtain a predefined phase shift between the first, the second and the third filtered term, the numbering from 1 to 3 being reflected on the numbering of the terminals $B_1, B_2, B_3, D_1, D_2, D_3$, and of the branches $F_1, F_2, F_3$ of the charging device, and on the designation of the measured values on these terminals or these branches.

The invention claimed is:

1. A rapid charging device for a battery, comprising:
a filtering stage of resistive-inductive-capacitive type to be connected to a three-phase network;
a buck stage;
a boost stage to be connected to terminals of the battery;
an induction winding which forms part of an electric machine and is electrically coupled between the buck stage and the boost stage; and
a regulating unit configured to impose chopping duty cycles on the buck stage and on the boost stage, in which the regulating unit comprises a first control module configured to compensate for the phase shift induced by the filtering stage between the currents and the voltages taken from each phase of the three-phase network, and also configured to maintain the value of the current amplitude passing through the winding above a non-zero predefined threshold by adjusting current passing through the electrical machine Idref as a function of the following formula:

Idref=Max{Iedref,Ibattref}+A, where:

Iedref is the current setpoint at the input of the rapid charging device,
Ibattref is the battery setpoint current delivered by a charge monitoring module, and
A is an arbitrary current constant to be fixed in value.

2. The rapid charging device as claimed in claim 1, in which the regulating unit also comprises a second control module configured to slave the current entering into the battery to a setpoint battery current value.

3. The rapid charging device as claimed in claim 1, further comprising:
a first current intensity measuring module which measures the intensities of currents entering into the device via the phases of the three-phase network; and
a second current intensity measuring module which measures the intensity of the current passing through the winding,
in which the first control module comprises at least two regulating loops using the measured intensity values to deliver three values used as buck stage chopping duty cycle setpoints.

4. The rapid charging device as claimed in claim 2, in which the second control module comprises a third regulating loop, delivering a value ($a_s$) used as boost stage chopping duty cycle setpoint.

5. The rapid charging device as claimed in claim 3, in which the first control module is further configured to determine three sinusoidal input voltages ($Ve_1, Ve_2, Ve_3$) at the points of connection ($B_1, B_2, B_3$) of the device to the three-phase network, and in which at least a first regulating loop involves the pulsing ($\omega$) of the input voltages ($Ve_1, Ve_2, Ve_3$).

6. The rapid charging device as claimed in claim 5, in which the first regulating loop is configured to slave to zero a component ($Ie_q$) obtained as a linear combination of the values ($Ie_1, Ie_2, Ie_3$) of the input current intensities, the coefficients of the linear combination being trigonometric functions of $\omega t$, in which t is a measurement of time.

7. The rapid charging device as claimed in claim 6, in which the regulating unit comprises an operator capable of performing three linear combinations of two values ($Ie_q, Ie_a$) derived from two of the regulating loops, the coefficients of each of the three linear combinations being trigonometric functions of $\omega t$.

8. A method for regulating a rapid charging device for a battery from a three-phase current, the battery coupled to an induction winding of an electrical machine, comprising:
controlling the chopping duty cycles (a1, a2, a3) of a buck stage, during which there is compensated, by combining the results of two regulating loops, a phase shift induced by a filtering stage of resistive-capacitive-inductive type, between the input current intensities (Ie1, Ie2, Ie3) of the rapid charging device and the input voltages (Ve1, Ve2, Ve3) of the rapid charging device; and
adjusting current passing through the induction winding of the electrical machine Idref as a function of the following formula:

Idref=Max{Iedref,Ibattref}+A, where:

Iedef is the current setpoint at the input of the rapid charging device,
Ibattref is the battery setpoint current delivered by a charge monitoring module, and
A is an arbitrary current constant to be fixed in value.

9. The method for regulating a rapid charging device as claimed in claim 8, further comprising:
filtering input voltages ($VE_c, VE_b, VE_a$) of the device such that they are modeled by the three components ($Ve_1, Ve_2, Ve_3$) of a vector ($\vec{V}e$) rotating in a plane $\{\vec{u}_1, \vec{u}_2\}$ with a pulsing $\omega$; and
then applying a regulating loop to cancel the component in this plane $\{\vec{u}_1, \vec{u}_2\}$, at right angles to the modeled vector ($\vec{V}e$) of the input voltages, of the vector $\vec{I}e$ having for the three components ($Ve_1, Ve_2, Ve_3$) three measured input intensities ($Ie_1, Ie_2, Ie_3$) of the device.

10. The method for regulating a rapid charging device as claimed in claim 8, in which a linear combination of three currents ($Ie_1$, $Ie_2$, $Ie_3$) measured at the input of the device are slaved to zero, the coefficients of the linear combination being trigonometric functions of $\omega t$, in which $\omega$ is a pulsing frequency of the input voltages of the device, and t is a measurement of time.

* * * * *